(12) United States Patent
Fukushima

(10) Patent No.: US 12,046,397 B2
(45) Date of Patent: Jul. 23, 2024

(54) WIRING MEMBER

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventor: Daichi Fukushima, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 238 days.

(21) Appl. No.: 17/629,052

(22) PCT Filed: Jul. 15, 2020

(86) PCT No.: PCT/JP2020/027459
§ 371 (c)(1),
(2) Date: Jan. 21, 2022

(87) PCT Pub. No.: WO2021/020122
PCT Pub. Date: Feb. 4, 2021

(65) Prior Publication Data
US 2022/0277871 A1      Sep. 1, 2022

(30) Foreign Application Priority Data
Jul. 31, 2019   (JP) ................. 2019-141121

(51) Int. Cl.
*H01B 7/42* (2006.01)
*B60R 16/02* (2006.01)
(Continued)

(52) U.S. Cl.
CPC ........... *H01B 7/42* (2013.01); *B60R 16/0215* (2013.01); *H01B 7/08* (2013.01); *H01B 7/40* (2013.01); *H02G 3/04* (2013.01)

(58) Field of Classification Search
CPC .......... H02G 3/03; H02G 3/04; H02G 3/0456; B60R 16/0207; B60R 16/0215;
(Continued)

(56) References Cited

U.S. PATENT DOCUMENTS

2005/0016764 A1   1/2005   Echigo et al.
2010/0051314 A1   3/2010   Watanabe et al.
(Continued)

FOREIGN PATENT DOCUMENTS

CN     1578589       2/2005
CN     101568973     10/2009
(Continued)

OTHER PUBLICATIONS

Office Action issued in Japan Patent Application No. 2019-141121, dated Oct. 4, 2022, together with English language translation thereof.
(Continued)

*Primary Examiner* — Timothy J Thompson
*Assistant Examiner* — Amol H Patel
(74) *Attorney, Agent, or Firm* — GREENBLUM & BERNSTEIN, P.L.C.

(57) ABSTRACT

A wiring member includes an electrical wire, a metal sheet, and a fixing resin part having resin as a main component, and the fixing resin part fixes the electrical wire to the metal sheet.

7 Claims, 3 Drawing Sheets

(51) Int. Cl.
*H01B 7/08* (2006.01)
*H01B 7/40* (2006.01)
*H02G 3/03* (2006.01)
*H02G 3/04* (2006.01)

(58) Field of Classification Search
CPC ... H01B 7/08; H01B 7/40; H01B 7/42; H01B 7/0846; H01B 7/428
See application file for complete search history.

(56) References Cited

U.S. PATENT DOCUMENTS

| | | | | |
|---|---|---|---|---|
| 2013/0137322 | A1* | 5/2013 | Watanabe | D06N 3/0063 442/45 |
| 2016/0221301 | A1 | 8/2016 | Okumura et al. | |
| 2019/0392963 | A1 | 12/2019 | Ishida et al. | |
| 2020/0172027 | A1 | 6/2020 | Mizuno et al. | |
| 2021/0245474 | A1 | 8/2021 | Okumura et al. | |
| 2022/0064500 | A1* | 3/2022 | Morioka | B32B 15/09 |

FOREIGN PATENT DOCUMENTS

| | | |
|---|---|---|
| CN | 101787178 | 7/2010 |
| CN | 103079819 | 5/2013 |
| CN | 103993340 | 8/2014 |
| CN | 105517795 | 4/2016 |
| CN | 105794331 | 7/2016 |
| JP | 2003-110068 | 4/2003 |
| JP | 2009029841 A * | 2/2009 |
| JP | 2017-091800 | 5/2017 |
| JP | 6239173 | 11/2017 |
| JP | 2018-137208 | 8/2018 |
| JP | 2019-003925 | 1/2019 |

OTHER PUBLICATIONS

International Search Report issued in International Patent Application No. PCT/JP2020/027459, dated Sep. 29, 2020, along with an English translation thereof.
International Preliminary Report on Patentability issued in International Patent Application No. PCT/JP2020/027459, dated Feb. 10, 2022, along with an English translation thereof.
China Office Action issued in China Patent Application No. 202080052917.X, dated Oct. 7, 2023, together with an English translation thereof.

* cited by examiner

F I G. 3
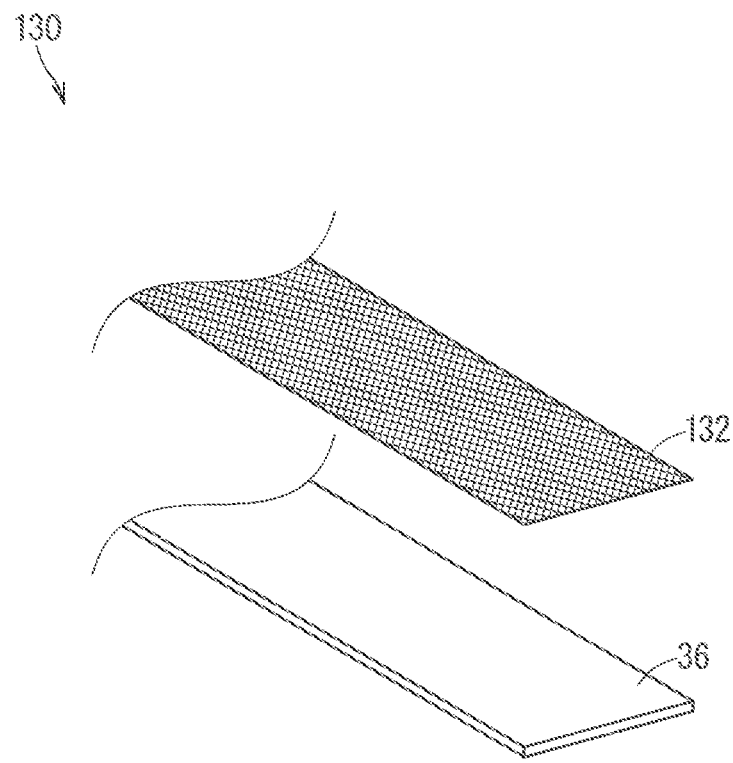
F I G 4
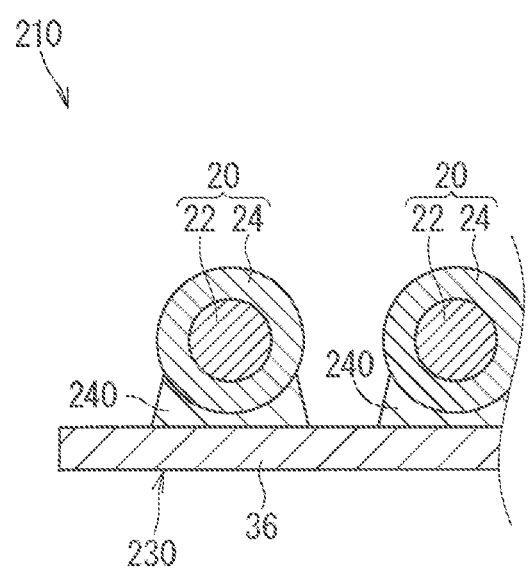

WIRING MEMBER

TECHNICAL FIELD

The present disclosure relates to a wiring member.

BACKGROUND ART

Patent Document 1 discloses a wire harness in which an electrical wire is welded to a functional exterior member formed into a sheet-like shape.

PRIOR ART DOCUMENTS

Patent Documents

Patent Document 1: Japanese Patent Application Laid-Open No. 2018-137208

SUMMARY

Problem to be Solved by the Invention

Desired is that heat of the electrical wire is easily radiated. Thus, an object is to provide a technique of easily radiating heat of the electrical wire.

Means to Solve the Problem

A wiring member according to the present disclosure includes an electrical wire, a metal sheet, and a fixing resin part having resin as a main component, and the fixing resin paid fixes the electrical wire to the metal sheet.

Effects of the Invention

According to the present disclosure, heat of the electrical wire is easily radiated.

BRIEF DESCRIPTION OF DRAWINGS

FIG. 3 is an exploded perspective view illustrating a modification example of a metal sheet.

FIG. 4 is a cross-sectional view illustrating a wiring member according to an embodiment 2.

DESCRIPTION OF EMBODIMENT(S)

Description of Embodiment of Present Disclosure

Embodiments of the present disclosure are listed and described firstly.

A wiring member according to the present disclosure is as follows.

(1) A wiring member includes an electrical wire, a metal sheet, and a fixing resin part having resin as a main component, wherein the fixing resin part fixes the electrical wire to the metal sheet. Accordingly, heat of the electrical wire is easily radiated via the metal sheet.

(2) The fixing resin part may contain a filler having higher thermal conductivity than the resin. Accordingly, the thermal conductivity of the fixing resin part is increased, and heat of the electrical wire is easily transmitted to the metal sheet.

(3) The fixing resin part may be formed by an adhesive agent bonding the metal sheet and the electrical wire. Accordingly, the electrical wire is simply fixed to the metal sheet by the adhesive agent.

(4) It is also applicable that the fixing resin part is a fusion layer stacked on the metal sheet, and the electrical wire is fused to the fusion layer. Accordingly, the electrical wire is simply fixed to the metal sheet by the fusion layer.

(5) it is also applicable that the metal sheet includes a porous layer formed to be porous, and a part of the fixing resin part enters a gap in the porous layer. Accordingly, the fixing resin part is favorably fixed to the porous layer by the anchor effect.

(6) It is also applicable that the metal sheet further includes a plate-like layer staked on the porous layer, and the plate-like layer is formed into a shape with an inner part evenly filled and stacked on an opposite side of the porous layer from the electrical wire. Accordingly, the plate-like layer can suppress resin of the fixing resin part reaching a rear surface of the metal sheet from a surface thereof on a side of the electrical wire.

(7) It is also applicable that the electrical wire includes an end portion extending from the metal sheet to an outer side, the fixing resin part includes a first fixing resin part and a second fixing resin part having higher thermal conductivity than the first fixing resin part, and a part of the electrical wire fixed by the second fixing resin part is closer to the end portion than the part fixed by the first fixing resin part. Accordingly, heat generated in a part of the electrical wire extending from the sheet to an outer side is easily radiated via the second fixing resin part.

DETAILS OF EMBODIMENT OF PRESENT DISCLOSURE

Specific examples of a wiring member of the present disclosure are described hereinafter with reference to the drawings. The present disclosure is not limited to these examples, but is indicated by claims, and it is intended that meanings equivalent to claims and all modifications within a scope of claims are included.

Embodiment 1

Figure 1:
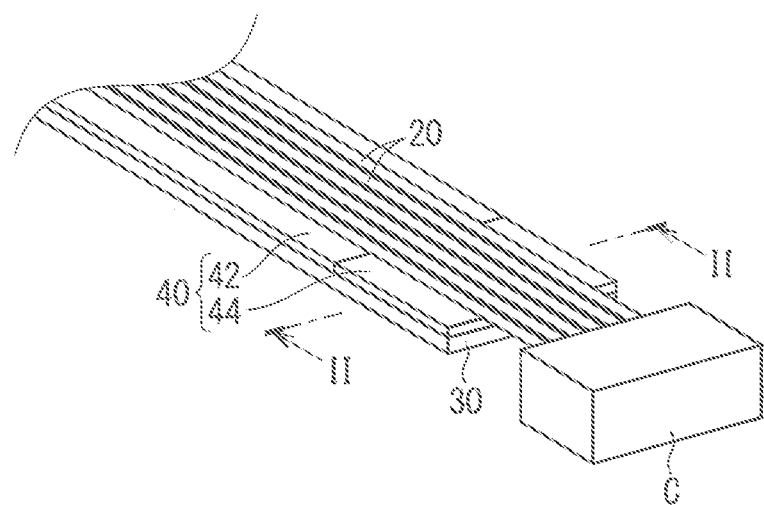
FIG. 1 is a perspective view illustrating a wiring member according to an embodiment 1.
Figure 2:
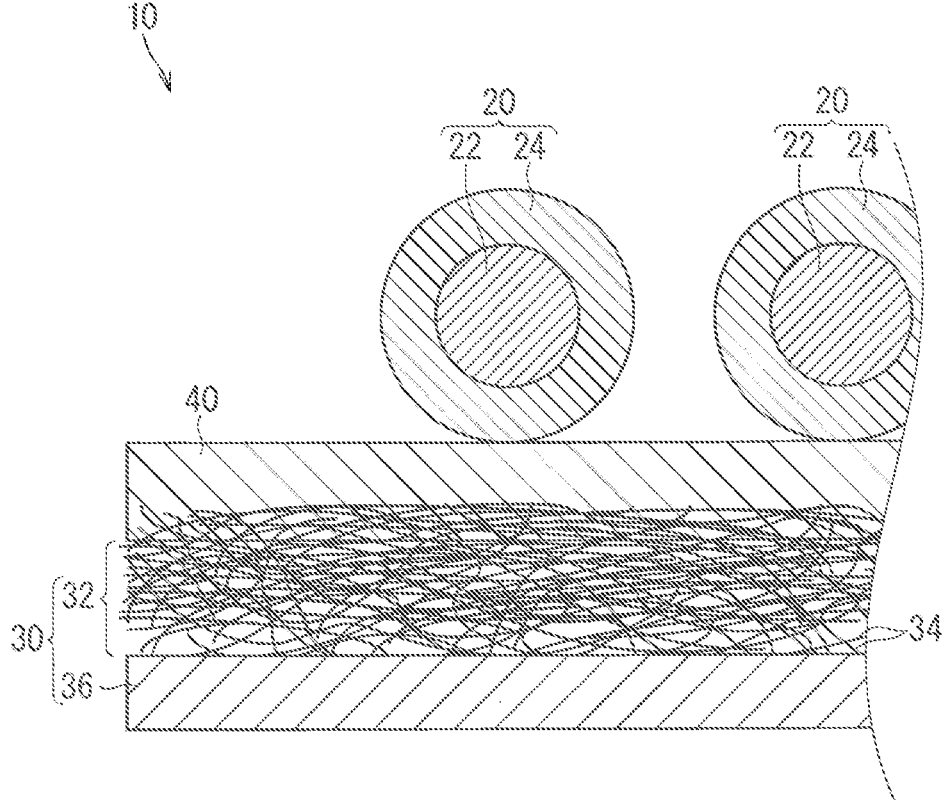
FIG. 2 is a cross-sectional view along a II-II line in FIG. 1.

A wiring member 10 according to an embodiment 1 is described hereinafter. FIG. 1 is perspective view illustrating a wiring member 10 according to the embodiment 1. FIG. 2 is a cross-sectional view along a II-II line in FIG. 1.

The wiring member 10 is mounted to a vehicle, for example. The wiring member 10 is used as a wiring connecting electrical components in the vehicle. The wiring member 10 includes an electrical wire 20, a metal sheet 30, and a fixing resin part 40. The fixing resin part 40 fixes the electrical wire 20 to the metal sheet 30.

The electrical wire 20 includes one or a plurality of electrical wires. The electrical wire 20 includes a core wire 22 and a covering layer 24. The core wire 22 includes one or a plurality of strands. The strand is linearly formed of a conductor made of copper, copper alloy, aluminum, or aluminum alloy as a material, for example. When the core wire 22 is made up of the plurality of strands, the plurality of strands may be or may not be stranded. The covering layer 24 covers the core wire 22. The covering layer 24 is formed of a material such as a resin having an insulation property. The covering layer 24 may be formed of a fusion material extrusion molded around the core wire 22. The covering layer 24 may be formed by applying an insulating varnish around the core wire 22, for example.

Herein, the electrical wire 20 is a single wire. The electrical wire may be a multicore cable. The multicore cable is formed into a shape in which a second covering layer (also referred to as a sheath or a jacket) is provided around a plurality of single wires each including the core wire 22 and the covering layer 24. The electrical wire may be a shield wire, a twisted wire, an enamel wire, a nichrome wire, or a coaxial wire, for example.

When the plurality of electrical wires 20 included, the plurality of electrical wires 20 may be planarly disposed on the metal sheet 30. Accordingly, the wiring member 10 is wholly formed into a flat state. The plurality of electrical wires 20 may extend on the metal sheet 30 along a route in accordance with a route of the electrical wires 20 in the vehicle. The plurality of electrical wires 20 may include an electrical wire bended on the metal sheet 30. The plurality of electrical wires 20 may include an electrical wire branched on the metal sheet 30. That is to say, a branch part may be provided on the metal sheet 30.

The electrical wire 20 includes an end portion extending from the metal sheet 30 to an outer side. A connector C is provided on the end portion of the electrical wire 20. The connector C is formed by housing the end portion of the electrical wire 20 in a housing. A terminal, for example, may be connected to the end portion of the electrical wire 20. A part which is not fixed to the metal sheet 30 (referred to as an electrical wire separated part hereinafter) is generated between a part housed in the housing and a part fixed to the metal sheet 30 in the electrical wire 20.

The metal sheet 30 includes a porous layer 32 and a plate-like layer 36. A material constituting the metal sheet 30 is not particularly limited. Examples of a material constituting the metal sheet 30 include iron, stainless, aluminum, aluminum alloy, copper, and copper alloy. A material constituting the porous layer 32 and a material constituting the plate-like layer 36 may be the same or different from each other.

The porous layer 32 is a layer formed to be porous. A porous configuration includes a large amount of minute holes through which air and liquid can pass. The holes pass through the porous layer 32 in a front-back direction. Air and liquid can pass through the porous layer 32 in the front-back direction. Herein, the porous layer 32 is a fibrous layer in which a metal fiber 34 is collected. Particularly herein, the fibrous layer is formed into a non-woven cloth-like form in which a large amount of metal fibers 34 are collected at random. A diameter of the fiber of the metal fiber 34 is equal to or larger than 10 micrometers and equal to or smaller than 250 micrometers, for example. A base weight of the fibrous layer is may be equal to or larger than 100 g/m$^2$ and equal to or smaller than 5000 g/m$^2$. A thickness of the fibrous layer may be equal to or larger than 0.05 millimeters and equal to or smaller than 5.0 millimeters. The fibrous layer may be a woven cloth or a fabric cloth formed by wearing or braiding the metal fiber 34, for example. The metal fiber 34 may be a metal single body, that is to say, a material which does include a resin material, for example. The metal fiber 34 may include a resin material, for example, in addition to a metal material. For example, the metal fiber 34 may be made up of a resin fiber with its surface coated with a metal material.

The porous layer 32 needs not be a fibrous layer. For example, the porous layer 132 may be a meshed layer as with a metal sheet 130 according to a modification example illustrated in FIG. 3. A wire diameter of a metal wire constituting the meshed layer may be equal to or larger than 0.010 millimeters and equal to or smaller than 2.0 millimeters. The mesh (the number of reticulations included in a square one inch on a side) may be equal to or larger than 2 and equal to or smaller than 2400. An aperture in the meshed layer may be equal to or larger than 0.001 millimeters and equal to or smaller than 16 millimeters, for example. Moreover, the porous layer may be a plate-like member having a plurality of holes in an inner part evenly filled.

The plate-like layer 36 is stacked on the porous layer 32. The plate-like layer 36 is stacked on an opposite side of the porous layer 32 from the electrical wire 20. The plate-like layer 36 is a layer through which air and liquid hardly passes compared with the porous layer 32. The plate-like layer 63 is formed into a shape with its inner part evenly filled. A through hole is not formed in the plate-like layer 36. Needless to say, the plate-like layer 36 may include air bubbles generated in a manufacturing process, for example. The plate-like layer 36 may be a metal foil, for example.

The porous layer 32 and the plate-like layer 36 are bonded to each other. Accordingly, the porous layer 32 and the plate-like layer 36 are kept in a stacked state. For example, a part of a metal material constituting the porous layer 32 having contact with a surface of the plate-like layer 36 is welded or sintered with a metal material constituting the plate-like layer 36 to bond the porous layer 32 and plate-like layer 36.

The metal sheet 30 is formed to have a size large enough to be able to include a route of the electrical wire 20. When the route of the electrical wire 20 is curved or branched, the metal sheet 30 may be formed to be curved or branched in accordance with the route of the electrical wire 20.

The fixing resin part 40 is formed of resin as a main component. The fixing resin part 40 fixes the electrical wire 20 to the metal sheet 30.

The fixing resin part 40 contains a filler. The filler has higher thermal conductivity than the resin which is a main component of the fixing resin part 40. The filler may include an inorganic filler or a metal filler. Applicable as a material of the inorganic filler is silica, aluminum oxide, magnesium oxide, beryllium oxide, boron nitride, aluminum nitride, silicon nitride, silicon carbide, boron carbide, titanium carbide, mullite, graphite, and carbon nanotube, for example. Copper, aluminum, silver, and iron is applicable as a material of the metal filler.

The fixing resin part 40 includes a first fixing resin part 42 and a second fixing resin part 44. The second fixing resin part 44 has higher thermal conductivity than the first fixing resin part 42. It is sufficient that the second fixing resin part 44 has higher thermal conductivity than the first fixing resin part 42 in a state where the first fixing resin part 42 and the second fixing resin part 44 have shapes in the wiring member 10. It is also applicable that the second fixing resin part 44 has higher thermal conductivity than the first fixing resin part 42 when the first fixing resin part 42 and the second fixing resin part 44 have the same shape. For example, it is also applicable that a type of resin as a main component is different from each other, thus the second fixing resin part 44 has higher thermal conductivity than the first fixing resin part 42. For example, it is also applicable that a type and an amount of resin as a main component are different from each other, thus the second fixing resin part 44 has higher thermal conductivity than the first fixing resin part 42.

A part of the electrical wire 20 fixed by the second fixing resin part 44 is closer to an end portion of the electrical wire 20 than a part thereof fixed by the first fixing resin part 42. As described above, the electrical wire separated part is generated between the end portion housed in the housing and the part fixed to the metal sheet 30 in the electrical wire 20. The part of the electrical wire 20 fixed by the second fixing resin part 44 is closer to the electrical wire separated part than the part thereof fixed by the first fixing resin part 42.

The second fixing resin part 44 is provided, thus heat is hardly accumulated in the electrical wire separated part. More specifically, the thermal conductivity of the second fixing resin part 44 is increased, thus heat of a part of the electrical wire 20 having contact with the second fixing resin part 44 is transmitted to the metal sheet 30 easily. Accordingly, a temperature of the part of the electrical wire 20 having contact with the second fixing resin part 44 is hardly increased compared with a temperature of the electrical wire separated part. Accordingly, the heat generated in the electrical wire separated part is transmitted to the part of the electrical wire 20 having contact with the second fixing resin part 44 easily, thus the heat is hardly left in the electrical wire separated part.

Herein, the fixing resin part 40 is a fusion layer. The fusion layer is stacked on the metal sheet 30. Herein, the fusion layer is stacked on the porous layer 32. A part of the fusion layer enters a gap in the porous layer 32. Accordingly, the fusion layer is kept in a state of being stacked on the porous layer 32. The electrical wire 20 is fused to the fusion layer. The electrical wire 20 is fused to the fusion layer as described hereinafter, for example. That is to say, ultrasonic welding or thermal pressurized welding is performed in a state where the electrical wire 20 is disposed on the fusion layer provided on the metal sheet 30. Accordingly, at least one of the resin constituting the fusion layer and the resin constituting the covering layer 24 is melted, bonded to the other side layer, and solidified.

Applicable as the resin material constituting the fusion layer is a material having compatibility with resin constituting the covering layer 24 such as a resin material of the same type as the resin constituting the covering layer 24. For example, when the covering layer 24 is made of PVC, the fusion layer may also be made of PVC. For example, when the covering layer 24 is made of polyolefin, the fusion layer may also be made of polyolefin.

The fusion layer may be provided in a whole region of a main surface of the metal sheet 30. The fusion layer may be provided in a partial region of the main surface of the metal sheet 30. When the plurality of electrical wires 20 are parallel to each other, the fusion layer may be also located between the electrical wires 20 parallel to each other.

A whole region of the electrical wire 20 on the metal sheet 30 may be fixed to the metal sheet 30 via the fusion layer. A partial region of the electrical wire 20 on the metal sheet 30 may be fixed to the metal sheet 30 via the fusion layer. At this time, there is a part where the electrical wire 20 and the fusion layer are not fixed to each other on the metal sheet 30, thus the partial region of the electrical wire 20 on the metal sheet 30 may be fixed to the metal sheet 30 via the fusion layer. There is a part where the fusion layer is not provided on the metal sheet 30, thus the partial region of the electrical wire 20 on the metal sheet 30 may be fixed to the metal sheet 30 via the fusion layer. That is to say, in the part where the electrical wire 20 and the metal sheet 30 are not fixed to each other, the fusion layer may or may not intervene between the electrical wire 20 and the metal sheet 30.

When the partial region of the electrical wire 20 on the metal sheet 30 is fixed to the metal sheet 30 via the fixing resin part 40, a fixing region is appropriately set. For example, the electrical wire 20 may be intermittently fixed to the metal sheet 30 along a longitudinal direction of the electrical wire 20 via the fusion layer.

The electrical wire 20 and the metal sheet 30 do not have contact with each other in a part of the electrical wire 20 fixed to the metal sheet 30 by the fixing resin part 40. That is to say, in the part of the electrical wire 20 fixed to the metal sheet 30 by the fixing resin part 40, the fixing resin part 40 intervenes between the electrical wire 20 and the metal sheet 30. However, the electrical wire 20 and the metal sheet 30 may have contact with each other in a part of the electrical wire 20 fixed to the metal sheet 30 by the fixing resin part 40. For example, it is also applicable that the part of the fusion layer intervening between the electrical wire 20 and the metal sheet 30 is wholly melted at the time of welding the electrical wire 20 to the fusion layer, and the electrical wire 20 is welded to have contact with the metal sheet 30.

Effect Etc. of Embodiment 1

According to the wiring member 10 having the above configuration, heat of the electrical wire 20 is easily radiated via the metal sheet 30. A heat radiation property of the electrical wire 20 is increased, thus downsizing of the electrical wire 20 can also be achieved.

The fixing resin part 40 contains the filler, thus thermal conductivity of the fixing resin part 40 is increased, and heat of the electrical wire 20 is transmitted to the metal sheet 30 easily. The electrical wire 20 is simply fixed to the metal sheet 30 by the fusion layer.

The metal sheet 30 includes the porous layer 32, thus the fixing resin part 40 is favorably fixed to the porous layer 32 by the anchor effect. The metal sheet 30 further includes the plate-like layer 36, thus the plate-like layer 36 can suppress the resin of the fixing resin part 40 reaching the rear surface of the metal sheet 30 from the surface thereof on the side of the electrical wire 20.

The part of the electrical wire 20 fixed by the second fixing resin part 44 is closer to the end portion of the electrical wire 20 than a part thereof fixed by the first fixing resin part 42, thus the heat generated in the part of the electrical wire 20 extending from the metal sheet 30 to the outer side is easily radiated via the second fixing resin part 44.

Embodiment 2

A wiring member according to an embodiment 2 is described. FIG. 4 is a cross-sectional plan view illustrating a wiring member 210 according to the embodiment 2. In the following description of the present embodiment, the same reference numerals are assigned to the similar constituent elements described above, and the description thereof will be omitted.

The wiring member 210 is different from the wiring member 10 described above in that a fixing resin part 240 is an adhesive agent. The adhesive agent bonds a metal sheet 230 and the electrical wire 20. The wiring member 210 is different from the wiring member 10 described above in that the fixing resin part 240 is fixed to the plate-like layer 36 of the metal sheet 230. At this time, in the example illustrated in FIG. 4, the metal sheet 230 does not include the porous layer 32. The fixing resin part 240 may be fixed to the plate-like layer 36 of the metal sheet 30 including the porous layer 32.

A resin material constituting the adhesive agent may be selected in accordance with a configuration of being bonded to the electrical wire 20, a configuration of being bonded to the metal sheet 230, a material of the electrical wire 20, and a material of the metal sheet 230, for example. The resin material constituting the adhesive agent may be thermoplastic resin or thermoset resin. The resin material constituting the adhesive agent may be epoxy resin, silicone, modified silicone, acrylic resin, or cyanoacrylate series, for example. The adhesive agent may also include a filler. The adhesive agent and the covering layer 24 may be bonded by a physical action such as an anchor effect or may also be bonded by a chemical action such as a chemical bonding, for example. In the similar manner, the adhesive agent and the metal sheet 230 may be bonded by a physical action such as an anchor effect or may also be bonded by a chemical action such as a chemical bonding, for example.

When the fixing resin part 240 is fixed to the plate-like layer 36, the anchor effect tends to be weak compared with a case where the fixing resin part 240 is fixed to the porous layer 32. In this case, the fixing resin part 240 may include a chemical compound including a metal side reactive group and a resin side reactive group. The metal side reactive group is a reactive group binding chemically to a metal material constituting the metal sheet 30. The metal side reactive group is an alkoxy group, for example. The resin side reactive group is a reactive group binding chemically to a resin material constituting the covering layer 24. The resin side reactive group is an amino group, a thiol group, an epoxy group, a vinyl group, an acrylic group, and a methacryl group, for example. Such a chemical compound may be a silane coupling agent, for example.

In the example illustrated in FIG. 4, the adhesive agent has contact with only a part of an area around the electrical wire 20. In this case, the adhesive agent may be bonded to both the electrical wire 20 and the metal sheet 230. In this case, the adhesive agent is provided on a whole area around the electrical wire 20 directed to the metal sheet 230.

Figure 5:
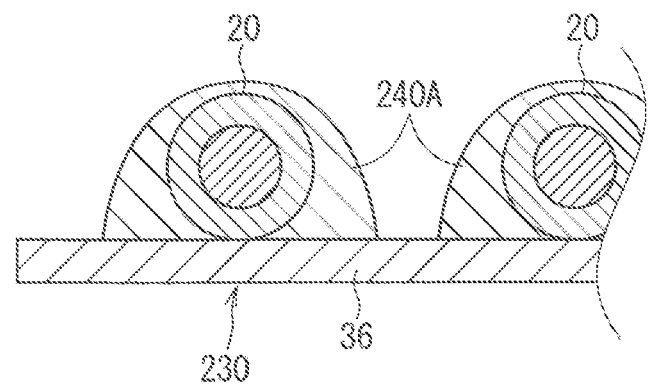
FIG. 5 is a cross-sectional view illustrating a modification example of a fixing resin part.

As illustrated in FIG. 5, the adhesive agent constituting the fixing resin part 240A may wrap the whole area around the electrical wire 20. In this case, the adhesive agent may be bonded to the metal sheet 230. The adhesive agent may be or may not be bonded to the electrical wire 20.

Figure 6:
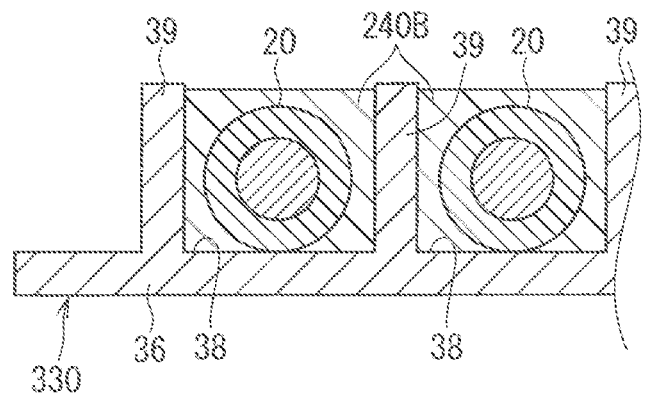
FIG. 6 is a cross-sectional view illustrating another modification example of the fixing resin part.

As illustrated in FIG. 6, a groove 38 in which the electrical wire 20 is housed may be formed in a metal sheet 330. Then, an adhesive agent constituting the fixing resin part 240B may fill the groove 38. In this case, the adhesive agent may be bonded to the metal sheet 330. The adhesive agent may be or may not be bonded to the electrical wire 20. In the example illustrated in FIG. 6, a plurality of ribs 39 are provided on a main surface of the metal sheet 330 to form the groove 38. However, a part of a main surface of the metal sheet is concaved to form a groove.

In the example illustrated in FIG. 4 to FIG. 6, there is a part where the adhesive agent is not provided between the electrical wires 20 parallel to each other. However, the adhesive agent may be provided between the electrical wires 20 parallel to each other.

Effect Etc. of Embodiment 2

Also according to the wiring member 210 in the present example, heat of the electrical wire 20 is easily radiated via the metal sheet 230. According to the wiring member 210 in the present example, the electrical wire 20 is simply fixed to the metal sheet 230 by the adhesive agent.

Modification Example

In the above description, the fixing resin part 40 includes the filler, however, the fixing resin part 40 may not include the filler.

In the description in the embodiment 1, the fixing resin part 40 includes the first fixing resin part 42 and the second fixing resin part 44 having the thermal conductivity different from each other, however, this configuration is not necessary. The fixing resin part 40 on the metal sheet 30 may be formed to have even thermal conductivity.

The configurations described in the embodiments and modification examples thereof can be appropriately combined as long as they are not contradictory. For example, the adhesive agent may be fixed to the porous layer 32. For example, the fusion layer may be provided on the plate-like layer 36.

EXPLANATION OF REFERENCE SIGNS 10, 210 wiring member
20 electrical wire
22 core wire
24 covering layer
30, 130, 230, 330 metal sheet
32, 132 porous layer
34 metal fiber
36 plate-like layer
38 groove
39 rib
40, 240, 240A, 240B fixing resin part
42 first fixing resin part
44 second fixing resin part
C connector

The invention claimed is:

1. A wiring member, comprising:
an electrical wire;
a metal sheet; and
a fixing resin part having resin as a main component, wherein
the fixing resin part fixes the electrical wire to the metal sheet,
the metal sheet includes a porous layer formed to be porous,
a part of the fixing resin part enters a gap in the porous layer,
the metal sheet further includes a plate-like layer stacked on the porous layer, and
the plate-like layer is formed into a shape with an inner part evenly filled and stacked on an opposite side of the porous layer from the electrical wire.

2. The wiring member according to claim 1, wherein the fixing resin part contains a filler having higher thermal conductivity than the resin.

3. The wiring member according to claim 1, wherein the fixing resin part is formed by an adhesive agent bonding the metal sheet and the electrical wire.

4. The wiring member according to claim 1, wherein the fixing resin part is a fusion layer stacked on the metal sheet, and
the electrical wire is fused to the fusion layer.

5. A wiring member comprising:
an electrical wire;
a metal sheet; and
a fixing resin part having resin as a main component, wherein
the fixing resin part fixes the electrical wire to the metal sheet,
the electrical wire includes an end portion extending from the metal sheet to an outer side,
the fixing resin part includes a first fixing resin part and a second fixing resin part having higher thermal conductivity than the first fixing resin part, and
a part of the electrical wire fixed by the second fixing resin part is closer to the end portion of the electrical wire than a part of the electrical wire fixed by the first fixing resin part.

6. The wiring member according to claim 5, wherein
the metal sheet includes a porous layer formed to be porous, and
a part of the fixing resin part enters a gap in the porous layer.

7. The wiring member according to claim 6, wherein
the metal sheet further includes a plate-like layer stacked on the porous layer, and
the plate-like layer is formed into a shape with an inner part evenly filled and stacked on an opposite side of the porous layer from the electrical wire.

\* \* \* \* \*